UNITED STATES PATENT OFFICE 2,422,229

MANUFACTURE OF CHLORINATED QUINONES

Harry H. Fletcher, Nutley, N. J., assignor to United States Rubber Company, New York, N. Y., a corporation of New Jersey No Drawing. Application July 13, 1944, Serial No. 544,822

5 Claims. (Cl. 260—396)

This invention relates to the production of chlorinated quinones from phenolic derivatives of benzenes, and alpha-hydroxy-naphthalene compounds.

An object of the invention is to provide an improved process of converting said materials, directly to chlorinated quinones, by the action of elemental chlorine, with economy of materials and/or increased yields of the final products, especially chloranil (from the phenols) and 2,3-dichloro-1,4-naphthoquinone (from the alpha-naphthols), and homologs and analogs thereof. Other objects will be apparent from the following detailed description.

Broadly, the invention comprises passing gaseous halogen (chlorine) into a liquid medium containing the said hydroxy-aromatic compound, said liquid medium comprising a mixture of sulfuric acid and a saturated fatty acid containing from one to four carbon atoms, at an elevated temperature and substantially at atmospheric pressure. Ordinary commercial grades of the acids may be used. The fatty acid is of decreasing effectiveness where it contains above four carbon atoms.

The aromatic compounds to be converted are represented by the formulae

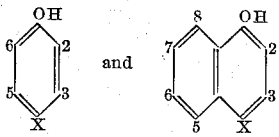

in which H is hydrogen, in which X is chosen from the groups —H, —OH, —SO$_3$H, and —Cl, and in which the 2, 3, 5, 6, 7, and 8 positions are occupied by any of the radicals hydrogen, chlorine, and alkyl. The compounds contain no amino substituents.

The concentration of the acids may vary in accordance with the nature of the aromatic compound, that is, whether it is a benzene derivative, or a naphthalene derivative.

In dealing with the benzene derivatives, the concentration of the sulfuric acid in the mixture of acids may be as high as 75% by weight, but is preferably between 25 and 55%, the remainder being the fatty acid such as acetic. A preferred mixture consists of about equal parts by weight of sulfuric acid (96%) and acetic acid (glacial). If desired, this mixture may be diluted somewhat with water.

In dealing with the naphthalene derivatives, the solvent mixture may contain from 5 to 50 parts of sulfuric acid (96%), from 50 to 95 parts of acetic acid (glacial) and from 0 to 45 parts of water. The added water improves the product. A preferred mixture consists of about 25 parts of sulfuric acid (96%), 71 parts of acetic acid, and 4 parts of water.

Instead of the acid mixtures specified above I may use the filtrate remaining after removal of the desired final product.

Any of the known chlorinating catalysts, e. g., iron, antimony, manganese, chromium, or compounds containing these elements, may be used, although the reaction proceeds smoothly even in their absence.

In order to decrease the time required to complete the chlorination, it is desirable to pass the chlorine into the reaction mixture at a rate somewhat in excess of that at which it will be absorbed by the hydroxy-substituted benzene or naphthalene compound, particularly in the later stages of the chlorination. In large scale practice this procedure may result in the loss of chlorine. Therefore, I advantageously pass the exit gases containing such excess chlorine into a second reactor having therein a fresh charge of the hydroxy-substituted compound and acid, whereby such excess chlorine is absorbed and thus recovered. When the chlorination in the first reactor has been completed, the mixture is discharged and replaced with a fresh charge of the hydroxy compound. Fresh chlorine is then passed into the partially chlorinated material in the second reactor until the reaction is finished, while the exit gases containing the excess of chlorine are passed into the fresh charge of the hydroxy compound in the first reactor.

The temperature of the reaction mixture, at least during the later stages after the strongly exothermic reaction has subsided, is preferably kept between 80° and 120° C. although the desired products may be obtained in somewhat lower yield and purity at temperatures between 40° and 80° C., and at temperatures above 120° C. Below 80° C. the reaction is rather slow, and below 40° C. it does not go to completion in any practical length of time. Above 120° C. the product is darker and less pure, but temperatures up to the boiling points of the solutions at atmospheric pressure may be used. (A mixture of 50 parts of sulfuric acid and 50 parts of acetic acid boils at about 135° C.)

I have found that in the case of the alpha-naphthols the conversion to the chlorinated naphthoquinones takes place in better yield and purity when the first exothermic part of the reaction with chlorine is carried out below 40° C.

followed by completion of the reaction at temperatures between 80° C. and 120° C., than when the entire reaction is carried out at temperatures between 80° C. and 120° C. The use of a temperature increase during the reaction between hydroxy-substituted benzenes and chlorine shows no comparable advantage over the use of a single temperature between 80° C. and 120° C.

The following examples illustrate my process.

*Example 1*

A mixture consisting of 46.5 gm. (0.5 mol) of phenol, 300 gm. of acetic acid, and 300 gm. of sulfuric acid is treated with chlorine substantially at atmospheric pressure, with stirring, at such a rate that unreacted chlorine is present in the exit gases, the mixture being heated under a reflux condenser to 105–115° C. The inflow of chlorine is continued at this temperature until the reaction is substantially complete, which requires about 14 hours. During the reaction the color of the solution is golden tan, and golden yellow shining plates of chloranil crystallize gradually until the hot solution is very thick with them. The cooled product is filtered, washed with water, and air dried. The yield is 92 gm., or 75% of theory, of lemon yellow chloranil, melting at 294–295° C., (corr.).

*Example 2*

A mixture consisting of 86.4 gm. (0.6 mol) of $\alpha$-naphthol, 426 gm. of acetic acid, 150 gm. of sulfuric acid, 24 gm. of water, and 20 gm. of $FeSO_4 \cdot 7H_2O$ is cooled in an ice bath to 15° C., and treated with chlorine between 10° C. and 20° C. for two hours with rapid stirring. During the next two hours the temperature of the mixture is raised gradually to 100° C. and then maintained between 100° C. and 120° C. for 6 hours. Throughout the entire time chlorine is passed with stirring into the mixture in sufficient volume so that unreacted chlorine is present in the gas coming out of the reflux condenser. The product is filtered from the cold mixture, washed with water and then with alcohol and air dried. The yield is 116 gm., or 85% of theory, of golden yellow 2,3-dichloro-1,4-naphthoquinone, melting at 189–191° C. (corr.).

Chloranil can be made by my process from phenol, p-phenol sulfonic acid, and hydroquinone. The chlorophenols, dichlorophenols, and sym-trichlorophenol can also be used. In like manner, 3,5,6-trichloro-2-methylbenzoquinone-1,4 can be made from o- or m-cresol by my process. 2,3-dichloro-1,4-naphthoquinone can be made by my process from 1-naphthol, 4-hydroxynaphthalene-1-sulfonic acid, and 2,4-dichloro-1-naphthol.

In place of acetic acid, formic, propionic or butyric acids may be used.

This list of compounds demonstates the versatility and widespread applicability of my process.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method of preparing chlorinated quinones from phenolic derivatives of benzene and alpha-hydroxynaphthalene compounds which comprises chlorinating the said aromatic compound by passing a gas consisting of elemental chlorine gas into an aqueous acid solution containing said compound, the acid component of said solution consisting of a mix of sulfuric acid with a saturated fatty acid containing from one to four carbon atoms.

2. A method of preparing chlorinated quinones from phenolic derivatives of benzene which comprises chlorinating the said aromatic compound by passing a gas consisting of elemental chlorine gas into an aqueous acid solution containing said compound, the acid component of said solution consisting of a mix of sulfuric acid with a saturated fatty acid containing from one to four carbon atoms, the concentration of sulfuric acid ranging from about 25 to about 75 percent of the sum of the two acids.

3. The method of preparing chlorinated quinones from phenolic derivatives of benzene and alpha-hydroxynaphthalene compounds which comprises chlorinating the said aromatic compound by passing a gas consisting of elemental chlorine gas into an aqueous acid solution containing said compound, the acid component of said solution consisting of a mix of sulfuric acid with acetic acid.

4. A method of preparing chloranil which comprises chlorinating phenol by passing a gas consisting of elemental chlorine gas into an aqueous acid solution containing the phenol, the acid component of said solution consisting of a mix of sulfuric acid with acetic acid.

5. A method of preparing 2,3-dichloro-1,4-naphthoquinone which comprises chlorinating alpha-naphthol by passing a gas consisting of elemental chlorine gas into an aqueous acid solution containing the said naphthol, the acid component of said solution consisting of a mix of sulfuric acid with acetic acid.

HARRY H. FLETCHER.

REFERENCES CITED

The following references are of record in the file of this patent:

FOREIGN PATENTS

| Number | Country | Date |
|--------|---------|------|
| 256,034 | Germany | Feb. 4, 1913 |
| 511,209 | Germany | Nov. 7, 1930 |

OTHER REFERENCES

Datta, Jour. Am. Chem. Soc., vol. 36, pp. 1011–3 (1914), vol. 45, pp. 480–2 (1923).

Kohn, "Monatsh," 46 pp. 347–53 (1926).

Above citations are in the Scientific Library.